United States Patent
Konda et al.

(10) Patent No.: US 11,632,254 B2
(45) Date of Patent: Apr. 18, 2023

(54) HOME OR ENTERPRISE ROUTER-BASED SECURE DOMAIN NAME SERVICES

(71) Applicant: McAfee, LLC., San Jose, CA (US)

(72) Inventors: Tirumaleswar Reddy Konda, Bangalore (IN); Shashank Jain, Bangalore (IN); Himanshu Srivastava, Bangalore (IN)

(73) Assignee: McAfee, LLC, San Jose, CA (US)

( * ) Notice: Subject to any disclaimer, the term of this patent is extended or adjusted under 35 U.S.C. 154(b) by 222 days.

(21) Appl. No.: 16/899,894

(22) Filed: Jun. 12, 2020

(65) Prior Publication Data

US 2021/0266185 A1 Aug. 26, 2021

(30) Foreign Application Priority Data

Feb. 21, 2020 (IN) .............................. 202041007453

(51) Int. Cl.
| | |
|---|---|
| *G06F 15/16* | (2006.01) |
| *H04L 9/32* | (2006.01) |
| *H04L 9/14* | (2006.01) |
| *H04L 61/58* | (2022.01) |
| *H04L 61/4511* | (2022.01) |
| *G06F 15/173* | (2006.01) |

(52) U.S. Cl.
CPC .............. *H04L 9/3268* (2013.01); *H04L 9/14* (2013.01); *H04L 61/4511* (2022.05); *H04L 61/58* (2022.05)

(58) Field of Classification Search
CPC ..... H04L 9/3268; H04L 9/14; H04L 61/4511; H04L 61/58; H04L 9/3247; H04L 12/2834
USPC .................................................. 709/224, 231
See application file for complete search history.

(56) References Cited

U.S. PATENT DOCUMENTS

| | | | |
|---|---|---|---|
| 10,594,658 B1 * | 3/2020 | Vixie | H04L 63/0272 |
| 2018/0062855 A1 * | 3/2018 | Bracken | H04L 9/3263 |
| 2018/0219976 A1 * | 8/2018 | Decenzo | H04L 65/612 |
| 2020/0351244 A1 * | 11/2020 | Moore | H04L 63/20 |
| 2021/0029074 A1 * | 1/2021 | Buck | H04L 63/083 |
| 2021/0168127 A1 * | 6/2021 | Jensen | H04L 9/3263 |
| 2021/0258350 A1 * | 8/2021 | Buck | H04L 61/4511 |
| 2021/0392110 A1 * | 12/2021 | Barnett | H04L 63/101 |
| 2022/0109623 A1 * | 4/2022 | Xie | H04L 45/741 |
| 2022/0141004 A1 * | 5/2022 | Murray | H04L 9/0861 |
| | | | 713/171 |

* cited by examiner

*Primary Examiner* — Karen C Tang
(74) *Attorney, Agent, or Firm* — Patent Capital Group

(57) ABSTRACT

There is disclosed in one example a home router, including: a hardware platform including a processor and a memory; a local area network (LAN) interface; a data store including rules for domain name-based services; and instructions encoded within the memory to instruct the processor to: provision a certificate and key pair to provide domain name system (DNS) over hypertext transfer protocol secure (DoH) or DNS over transport layer security (DoT) services; receive on the LAN interface an encrypted DNS request; decrypt the DNS request; query the data store according to the DNS request; receive a rule for the DNS request; and execute the rule.

19 Claims, 13 Drawing Sheets

HOME OR ENTERPRISE ROUTER-BASED SECURE DOMAIN NAME SERVICES

CROSS-REFERENCE TO RELATED APPLICATIONS

This application claims priority to the Indian Provisional Application 202041007453 entitled "Home or Enterprise Router-Based Secure Domain Name Services," filed 21 Feb. 2020, which is incorporated herein by reference.

FIELD OF THE SPECIFICATION

This application relates in general to computer network security, and more particularly, though not exclusively, to a system and method for providing home or enterprise router-based secure domain name services.

BACKGROUND

It is common for an enterprise gateway, including a family or home gateway, to provide a domain name system (DNS) server.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
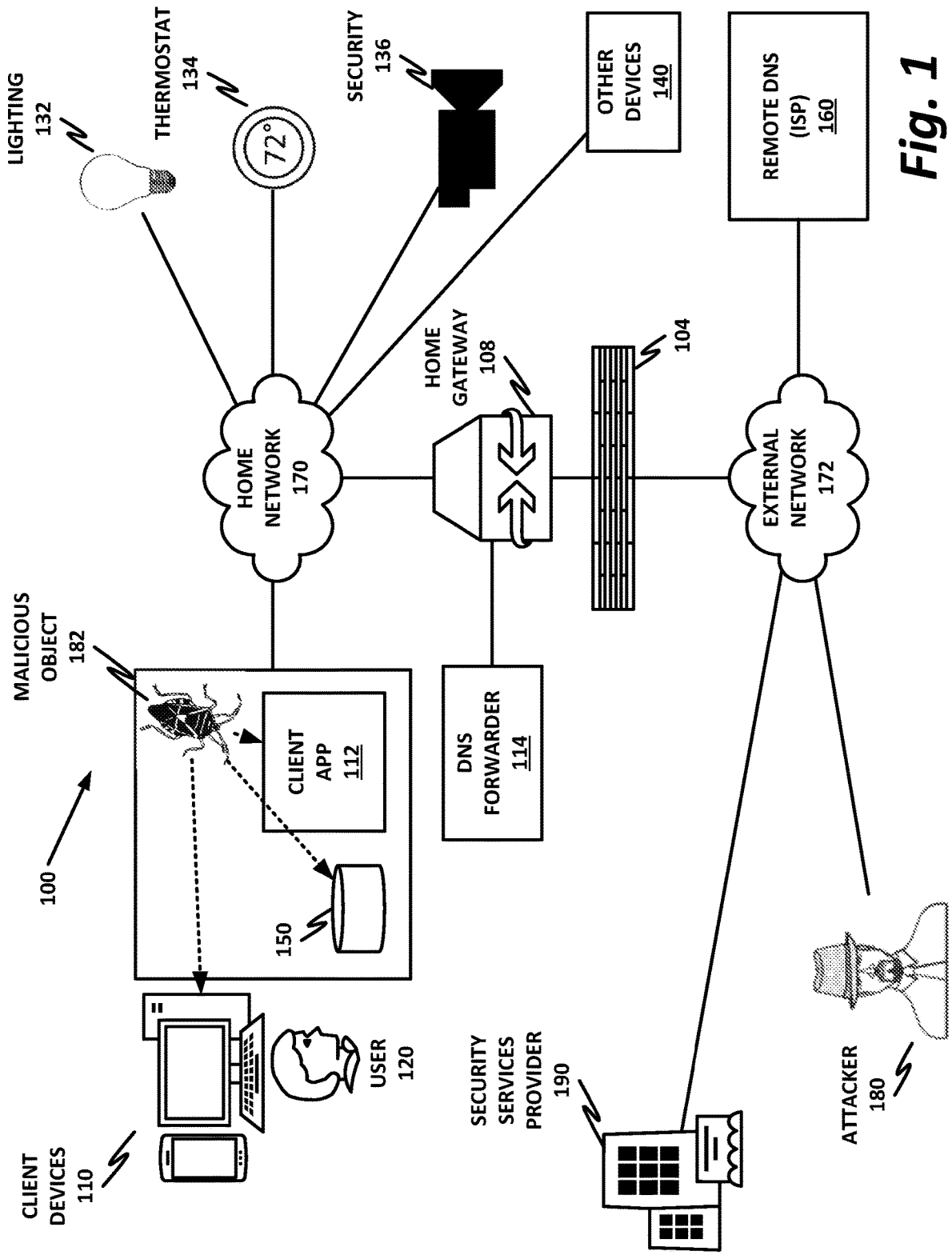
FIG. 1 is a block diagram of selected elements of a security ecosystem.

In an example, there is disclosed a home router, comprising: a hardware platform comprising a processor and a memory; a local area network (LAN) interface; a data store comprising rules for domain name-based services; and instructions encoded within the memory to instruct the processor to: provision a certificate and key pair to provide domain name system (DNS) over hypertext transfer protocol secure (DoH) or DNS over transport layer security (DoT) services; receive on the LAN interface an encrypted DNS request; decrypt the DNS request; query the data store according to the DNS request; receive a rule for the DNS request; and execute the rule.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Commonly, enterprises may provide a gateway to act as an access point between the enterprise and the internet, at large. As used in this specification, an enterprise may include a business, government, or other enterprise, and may also include a family or home routing system.

The enterprise or home gateway may provide a caching DNS server or a DNS forwarder. These can increase the speed of DNS queries for domain names that have recently been accessed. Commonly, a DNS cache may have a time to live (TTL), after which the DNS query may need to be refreshed. This provides enhanced speed, because internet users commonly access a relatively limited number of domain names over and over again. Because these queries do not need to go to the outside DNS server, they can be serviced much more quickly. After the TTL expires (e.g., after a timeout period such as 24 hours), the cached DNS entry is purged, and the next query may go out to the original DNS server. However, once again, it is common for users to access the same domain name multiple times. Thus, these queries may hit the DNS cache until the next timeout.

Another benefit of a caching DNS server on the local enterprise gateway is that it can be used to provide privacy, security, and policy enforcement for the enterprise. For example, the use of a caching DNS server limits the ability of the outside DNS server to know how often a particular domain name is accessed by enterprise users. Because the caching DNS server requests the internet protocol address for the domain name only once per TTL, the outside DNS server does not know how many more times the domain name is accessed during that TTL. The DNS server may employ workarounds to this issue, such as by providing a shortened TTL.

In a network, both internal and external DNS-based attacks can happen. Additionally, pervasive monitoring and modification of DNS messages within an enterprise network is also possible. Thus, the use of privacy and security enabling DNS servers ensures that the DNS communications are secure end-to-end.

This feature can also be used for DNS filtering. For example, a family or a nonfamily enterprise may maintain categories of domain names that are blocked, or otherwise restricted. For example, a family may choose to restrict access to pornography, advocacy for illegal or dangerous activity, or other content that is contrary to the family's values. A business or government enterprise may choose to categorize domain names into multiple categories. For example, domain names that are directly related to the enterprise's business operations may be unrestricted. Another category of domain names may include domains that are not restricted, but that are not directly related to the business or government function. These may require, for example, user verification and/or may be subject to special logging. Other domain names may be blocked outright by the enterprise.

Thus, domain name caching and forwarding may be used within an enterprise, including within a family, to provide parental and access controls, block malicious domains, or provide other features.

One difficulty with such DNS caching is newer DNS protocols that use encryption. For example, if an endpoint is configured to use internet-hosted or public DNS over transport layer security (DoT), or DNS over hypertext transfer protocol secure (DoH) servers, local DNS servers cannot service the encrypted DNS requests. Thus, the local caching DNS server may be prevented from providing services to local endpoints, and may not be able to enforce DNS filtering.

In some cases, browser platforms such as Firefox and operating systems like Android come preconfigured to use internet services hosted via public DoH and DoT servers. These evolving standards can help to address users' privacy concerns and provide security to a certain extent, but they may frustrate the enterprise or family's ability to provide legitimate controls over the use of its network.

Evolving DNS standards such as DoH and DoT also have major implications on security solutions. For example, MCAFEE, LLC provides Secure Home Platform (SHP), which is a home security service that provides, among other things, DNS forwarding and DNS caching with domain name filtering. However, if DNS traffic is encrypted, SHP and other home or enterprise security systems that are co-located on the home or enterprise cannot act on DNS requests from the endpoint and enforce their DNS filtering.

Furthermore, if the endpoint is an internet of things (IoT) device that is configured to use public DoT or DoH services, SHP or similar security platforms cannot enforce, for example, manufacturer usage description (MUD) rules that only allow intended communications to and from the IoT device.

In other words, an enterprise gateway or home security module such as SHP may not be able to enforce the network access control list (ACL) rules based on domain names that it is configured to accept.

Some effective solutions to providing additional services such as security and access control in a DoH or DoT infrastructure can be realized by partnering with an internet service provider (ISP) or a plurality of ISPs. If the ISPs are willing to adopt or adapt to new standards, then a client software on the consumer endpoint can be provided with a DoH or DoT server on the ISP's DNS server. However, this is not always a practical solution. In some cases, ISPs may be unable or unwilling to adopt new standards that provide domain name-based services in a DoH or DoT context.

In cases where ISP cooperation is not available, then a home or enterprise gateway may be configured to provide a caching DNS server.

A traditional caching DNS server or DNS forwarder is often provided in home networks. Traditional DNS servers or DNS forwarders may provide benefits such as DNS filtering to block access to malicious domains, or to provide parental or enterprise controls. However, if the endpoint is configured to use internet-hosted or public DNS over datagram transport layer security (DTLS) or DNS over HTTPS servers, any available local DNS server may not be able to serve DNS requests from local endpoints, or enforce DNS filtering.

Some existing browser platforms such as Firefox and operating systems like Android may already be preconfigured to use internet-hosted or public DoH/DoT servers. These evolving standards provide user privacy and security from DNS snooping.

Thus, home gateways like SHP provided by MCAFEE, LLC or enterprise gateways may be blocked from providing their traditional security services in a DoH or DoT context. Furthermore, if the endpoint is an IoT device that is configured to use public DoT or DoH servers, a home gateway such as SHP or similar may be unable to enforce MUD rules to allow only intended communications to and from the IoT device. In other words, the home gateway or enterprise gateway may be unable to enforce network ACL rules based on domain names.

A current proposed standard defines a mechanism to securely bootstrap endpoint devices with the authentication domain name (ADN) and DNS server certificate of the local network's DoT/DoH server. This provides for a mechanism for endpoints in a home network to discover DoT/DoH servers hosted in the ISP cloud, integrated with home gateway filtering policies. These can be further integrated with a global database, such as Global Threat Intelligence (GTI) provided by MCAFEE, LLC, to enforce DNS-based content filtering.

This mechanism is compatible with ISPs deploying DNS recursive servers with partners like Open-Xchange offering PowerDNS for DNS resolving services. The mechanism also works for ISPs willing to deploy a DoT/DoH server as a virtualized network function (VNF) with the appropriate functionality.

The remaining challenge, as discussed above, is that some ISPs may be unable or unwilling to use standards such as PowerDNS, and recursive DNS service providers may be unwilling to deploy these capabilities.

Furthermore, integration with every DNS recursive service provider is difficult and costly. Unless and until some of the extensions for DoH and DoT-based security services are adopted as a global standard used by almost every ISP, it cannot be assumed that ISPs will support these services.

Lacking global adoption by ISPs, a solution may be provided in which a DoT or DoH forwarder is provided on the home or enterprise router. In an illustrative method, a unique fully qualified domain name (FQDN) is assigned to each router, and provisioned with a domain validated certificate by a public certificate authority (CA) for the DoT/DoH forwarder hosted on the home or enterprise gateway or router. The DoT/DoH forwarder may then act like a public DoT/DoH server, but because it is available only on the local network, it is accessible only to endpoints within that network. This server may forward DNS requests to the ISP DNS recursive server. Furthermore, in at least some embodiments, there may be provisioned an internet protocol (IP)-validated certificate by a public CA for the DoT/DoH forwarder hosted on the home router.

A DoT/DoH capable DNS forwarder of the present specification may be hosted on a home or enterprise gateway or router. This allows network security solutions, like SHP by MCAFEE, LLC or similar, to provide DNS-based filtering, parental controls, IoT firewall capabilities, and other security and privacy related functions on the router, while still preserving the user's privacy with respect to DNS lookups. The DNS forwarder on the home router also uses DoT/DoH, while forwarding DNS queries to the upstream recursive resolver, thereby providing DNS privacy equivalent to internet-hosted or public DoH/DoT servers.

There is also disclosed herein a mechanism for assigning a unique FQDN for each home router, which may be necessary in some cases to receive a certificate from a public CA for the DoT/DoH server. Furthermore, there is disclosed an alternative mechanism for using an IP-validated certificate for the DoT/DoH forwarder hosted on the home or enterprise router or gateway.

In an illustrative embodiment, an automated certificate management environment (ACME) is used to get and manage a domain validated certificate for an FQDN, or an IP-validated certificate for an IPv6 prefix assigned to the router. A cloud service may be used to perform ACME-based certificate issuance and management processes. This can help to reduce the load on the router. The certificate and key pairs, generated on the cloud service, can then be provided to the home routers using a secure communication channel.

This addresses the issue of endpoints using public DoT/DoH DNS-based network security capabilities on the home routers. In some existing embodiments, DoT and DoH are incompatible with services such as DNS-based filtering. As noted above, this is one of a plurality of solutions to this issue. In other solutions, where ISP DoT/DoH servers are securely provisioned into the endpoint, using a mechanism such as ADN, it may not always be necessary for the home gateway to provide its own public DoH/DoT server. However, as noted above, this solution assumes close cooperation between the ISP and the network security service provider, which is not always the case.

According to the teachings of the present specification, network security services may be provided to enforce device specific DNS-based filtering policies, while preserving the user's privacy. In another advantageous aspect, there is no necessary modification to the ISP's DNS server, which means lower integration costs with ISPs and DNS providers.

Note that the teachings of the specification do not preclude partnering with ISPs to host DoT/DoH capable DNS servers on the ISP's infrastructure. It is still possible to integrate DNS-based filtering and parental control policies. However, in the absence of universal ISP cooperation, or in cases where users or enterprises wish to maintain local control of those DNS services rather than ceding control to an ISP service, it may be beneficial to provide localized DoH/DoT services.

This mitigates the issue that each ISP may have its own DNS provider, such as PowerDNS, Berkeley Internet Name Domain (BIND), or similar. This plurality of DNS providers makes it difficult to integrate filtering and policy frameworks with each ISP. Furthermore, some ISPs are tied to DNS providers that are unwilling to cooperate with security service providers to provide DNS filtering services. For example, some of those DNS providers may provide their own DNS-based filtering and parental control capabilities, which means that in that space, they may act as direct competitors to the security service providers.

Furthermore, cloud-based DoT/DoH capable DNS servers may not be configured to resolve internal-only domain names (e.g., "internal.example.com") in enterprise networks, or ".local" and ".home.arpa" in home networks. In these cases, a split DNS tunnel is sometimes deployed where a local DNS server serves internal-only queries over plaintext. This makes internal-only DNS queries vulnerable to attack in the local network.

Thus, the DoH/DoT services provided on a home gateway, according to the teachings of the present specification, provide a solution that is operable without tight integration with ISP DNS servers. Furthermore, this solution provides DNS-based filtering and parental control functionality over DoT/DoH.

Embodiments of the present specification provide solutions that eliminate dependencies on the ISP and its DNS server by hosting a DoT/DoH capable DNS forwarder on the home router. The DoT/DoH capable DNS forwarder may require the router to have a public domain name, and a DNS server certificate signed by public CA. As discussed above, there are at least two available mechanisms to get and provision a public domain name and server certificate for home routers. These include providing a unique subdomain, and providing a public IP address assigned to the router.

A system and method for providing home or enterprise router-based secure domain name services will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In at least some embodiments, security ecosystem 100 may be configured or adapted to provide privacy and security enabled DNS caching, according to the teachings of the present specification.

In the example of FIG. 1, security ecosystem 100 may be an enterprise, a government entity, a data center, a telecommunications provider, a "smart home" with computers, smart phones, and various IoT devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via home network 170. Home network 170 may be any suitable network or combination of one or more networks operating on one or more suitable networking protocols, including a local area network, an intranet, a virtual network, a wide area network, a wireless network, a cellular network, or the internet (optionally accessed via a proxy, virtual machine, or other similar security mechanism) by way of nonlimiting example. Home network 170 may also include one or more servers, firewalls, routers, switches, security appliances, antivirus servers, or other network devices, which may be single-purpose appliances, virtual machines, containers, or functions. Some functions may be provided on client devices 110.

The term "home network" should be understood to refer to the function of the network as a trusted or home-based network. It does not necessarily mean that it is a network for an individual family. Broadly, home network 170 may refer to any network, including an enterprise network, that user 120 regularly connects to, and in particular, a network having a gateway 108 that includes a caching DNS forwarder 114. Caching DNS forwarder 114 may be configured for use in embodiments of the present specification to provide secure DoH or DoT services to home network 170.

In this illustration, home network 170 is shown as a single network for simplicity, but in some embodiments, home network 170 may include any number of networks, such as one or more intranets connected to the internet. Home network 170 may also provide access to an external network, such as the internet, via external network 172. External network 172 may similarly be any suitable type of network.

Home network 170 may connect to the internet via gateway 108, which may be responsible, among other things, for providing a logical boundary between home network 170 and external network 172. Home network 170 may also provide home or enterprise gateway services, and may provide services such as dynamic host configuration protocol (DHCP), router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions and/or VNFs.

Home network 170 may also include a number of discrete IoT devices. For example, home network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Remote DNS 160 may be operated, for example, by the ISP that services home network 170 and provides a connection between home network 170 and external network 172. Remote DNS server 160 may provide comprehensive DNS services, such as maintaining a mirror of a master domain name lookup table that is used to resolve domain names to IP addresses. In some cases, remote DNS 160 may provide encrypted or other privacy enabled DNS services, such as DNS over TLS (DTLS) and/or DNS over HTTPS (DoH).

Privacy enabled DNS services may require a trusted and encrypted connection between client device 110 and remote DNS 160. This can cause problems if caching DNS forwarder 114 is to cache DNS requests and resolve cached domain names to provide increased speed and efficiency for home network 170. Furthermore, caching DNS forwarder 114 may also need to provide certain domain name-based services, such as domain name-based filtering, ACLs, parental controls, and other similar DNS services.

In an encrypted communication, caching DNS forwarder 114 is an intermediary between remote DNS 160 and client device 110. Thus, for caching DNS forwarder 114 to provide its intended functionality, either client device 110 must forego privacy enabled DNS services, or caching DNS forwarder 114 must be configured to act as an authorized intermediary between remote DNS 160 and client device 110. The present specification illustrates a number of devices and methods that provide this intermediary functionality, wherein caching DNS forwarder 114 acts as a broker for managing certificates and credentials between client device 110 and remote DNS 160. In general terms, in an unsecured network, remote DNS 160 and client device 110 can be agnostic of the presence of a caching DNS forwarder 114. In those cases, client device 110 simply issues a domain name lookup request, and that request is serviced either by caching DNS forwarder 114 or by remote DNS 160. Client device 110 does not need to know or care which one services the request, or even that there is a two-tiered DNS structure.

On the other hand, in the case of privacy enabled DNS services, caching DNS forwarder 114 is an active participant in establishing the trusted connection between client device 110 and remote DNS 160. Client device 110 still does not need to know which DNS server ultimately resolves its request, but caching DNS forwarder 114 in this case is an explicit part of the trust chain.

Home network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to home network 170, such as security software, security updates, network appliances, or similar. For example, MCAFEE, LLC provides a comprehensive suite of security services that may be used to protect home network 170 and the various devices connected to it.

It may be a goal of users 120 to successfully operate devices on home network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against home network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects may be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the GTI database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
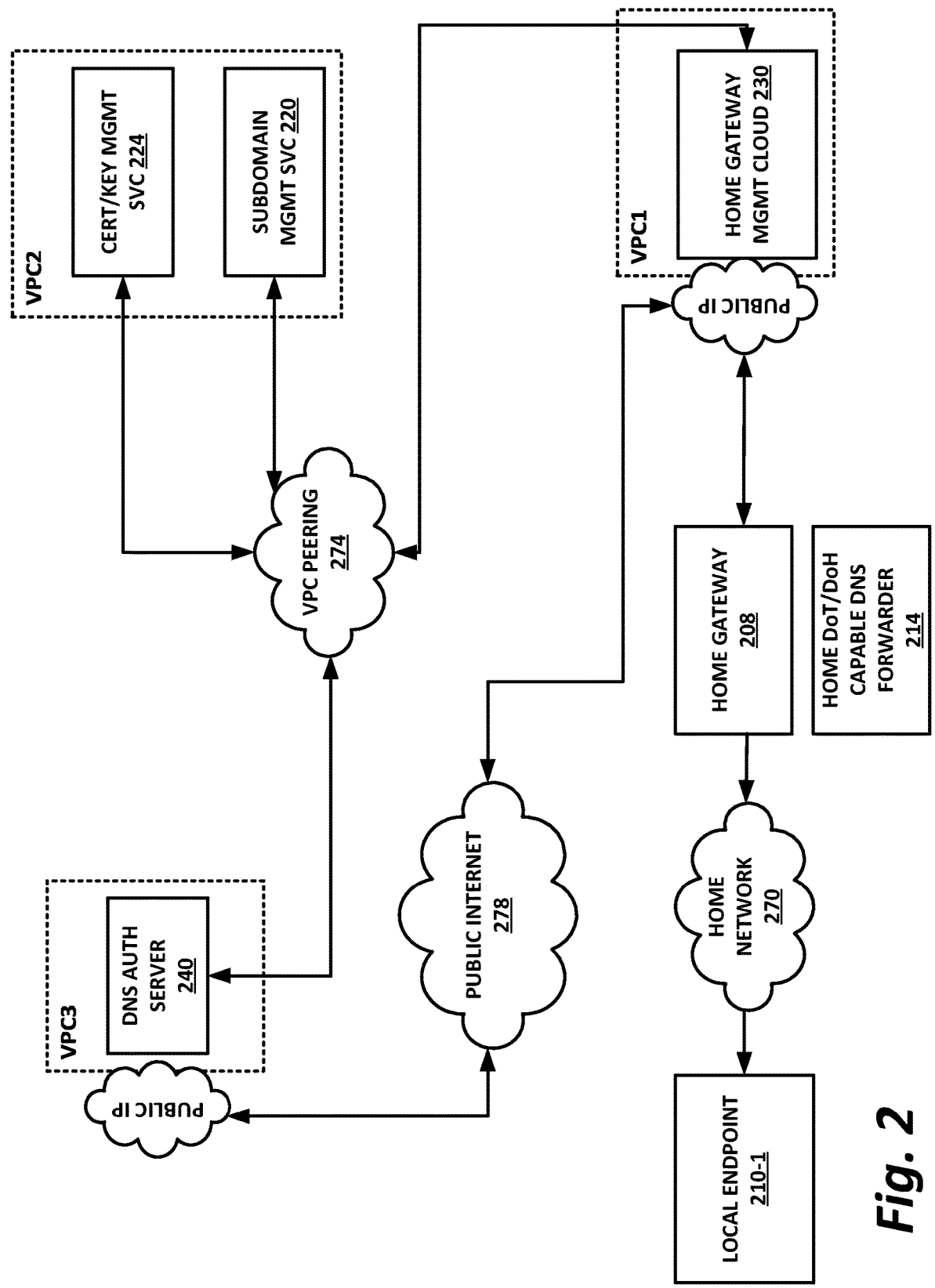
FIG. 2 is a block diagram illustrating further selected aspects of a security ecosystem.
Figure 3A:
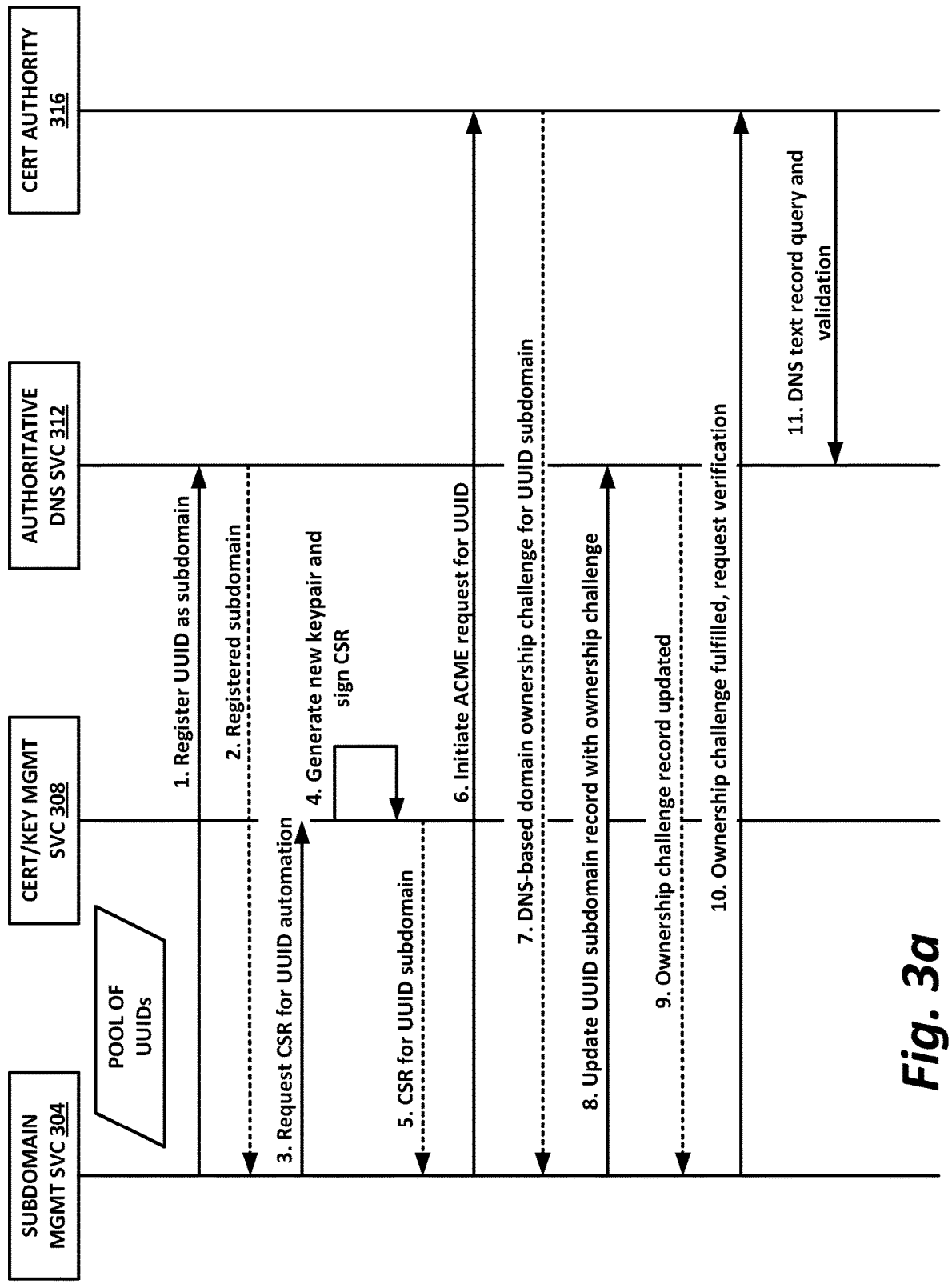
FIGS. 3a and 3b are a signal flow diagram illustrating management of subdomain certificates in the cloud.
Figure 3B:
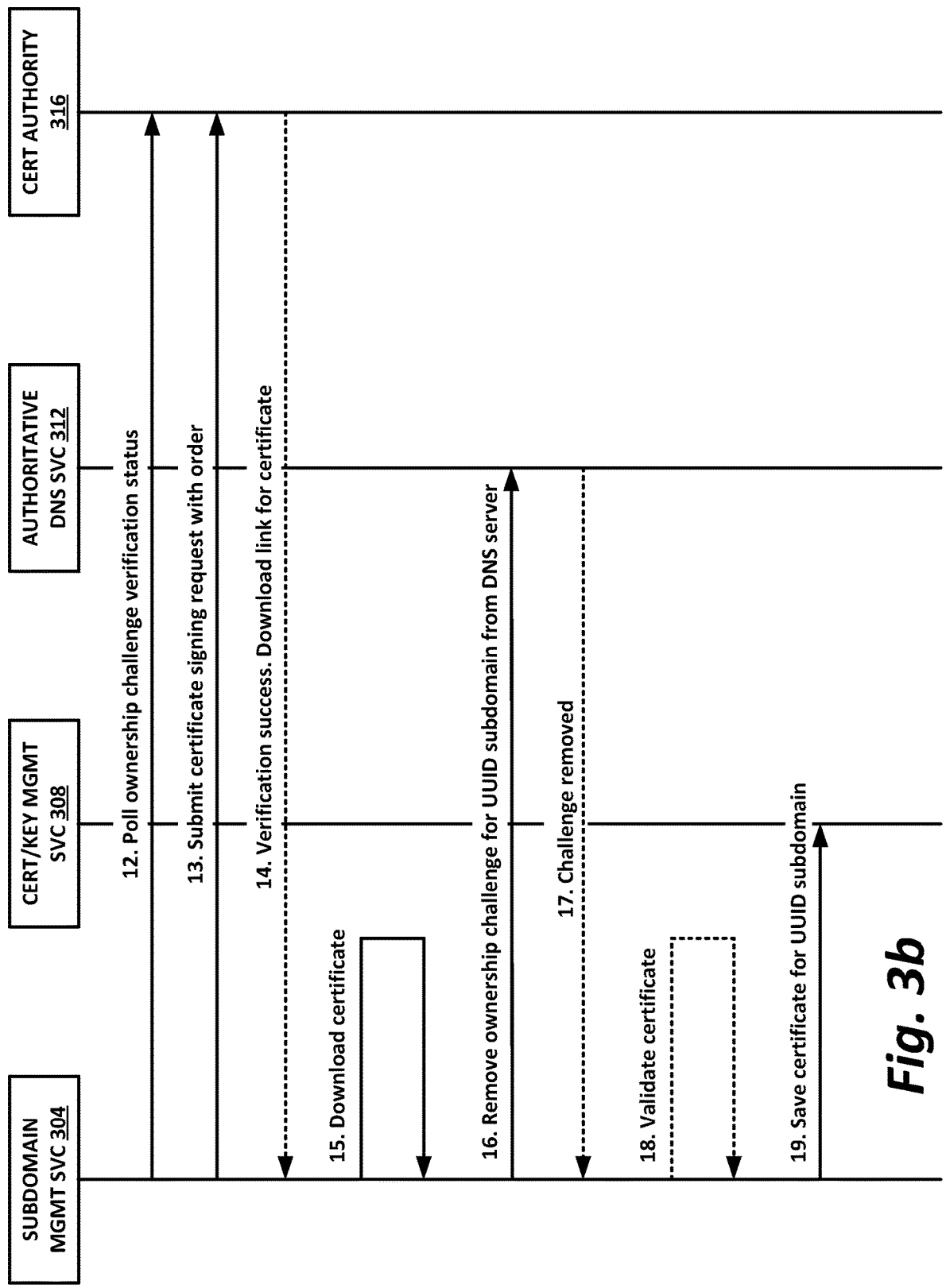
Figure 4:
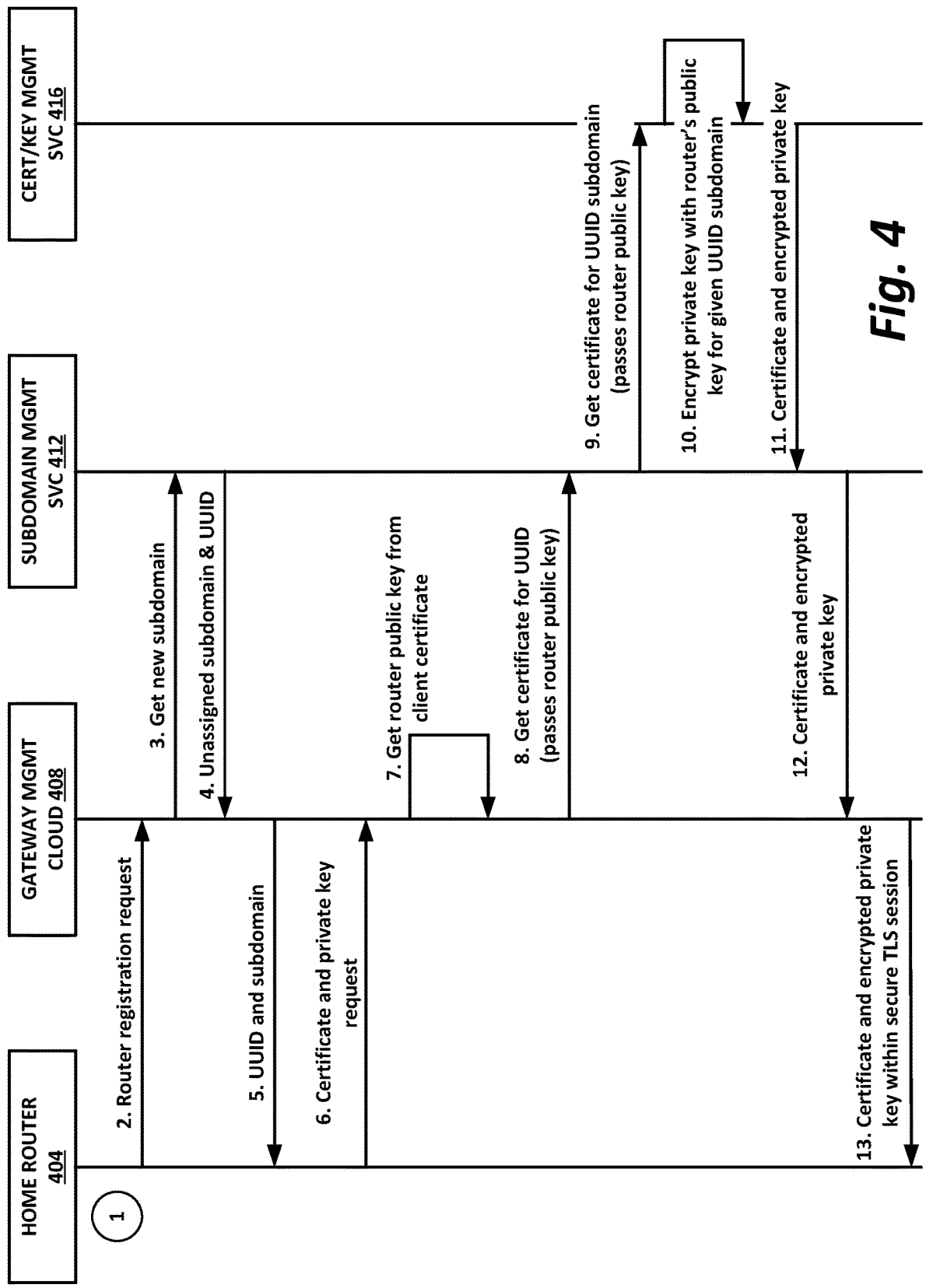
FIG. 4 is a signal flow diagram illustrating provisioning of subdomain certificates to home routers or home gateways.

In the discussion below, FIGS. 2-4 illustrate aspects of an embodiment in which a router is provided with an FQDN. FIGS. 5-6 illustrate aspects of an alternative embodiment, in which an IP-validated certificate for the DoT/DoH forwarder is provided.

FIG. 2 is a block diagram illustrating further selected aspects of a security ecosystem. In this configuration, a unique subdomain is assigned to each router by the security services provider, which may operate a security services cloud. The subdomains may be of the form:

<unique-router-identifier>.<primary-domain-name>.<top-level-domain>

The primary domain name can be any suitable domain name chosen by the security services provider. In this specification, the domain name "secureDNS.net" will be used as the primary domain name and the top level ".net" domain. This is provided as an illustrative example only, and it is noted that as of the date of this filing, secureDNS.net does not appear to be an active or operative domain name. If that domain name becomes active or operative in the future, there is no intention to imply or require a relationship between that domain name and the present specification.

The unique router identify portion of the FQDN is assigned to the individual router as a unique identifier. This could be, for example, a globally unique identifier (GUID) in the form of an IPv6 address, or other unique identifier. Furthermore, the unique identifier could be user selectable, similar to a username or handle, so that the user can assign a unique or preferred subdomain name to their own individual home router. Any other form of GUID can be used, wherein each router or a group of routers have their own individual GUID to distinguish them from one another.

A service such as ACME may then be used to automate the process of verification and certificate issuance for the subdomain. In an illustrative example, the process of verification and certificate issuance is automated and handled on a cloud service. Once a certificate is issued, it is provisioned to the router using a secure communication channel.

An illustrative architecture is illustrated in FIG. 2. A local endpoint 210-1 communicates via home network 270 with a home gateway 208. Home gateway 208 may include a home DoT/DoH capable DNS forwarder 214 and may have assigned to it, for example by a security services provider, a GUID. This GUID is used to distinguish home gateway 208 from all other home gateways in the networking ecosystem. Home gateway 208 communicates via public internet 278 with a home gateway management cloud 230, which may have a public IP address to make it accessible via public internet 278. Virtual private cloud (VPC) peering 274 may be used to communicatively couple a first VPC (VPC1) that includes home gateway management cloud 230 with a second VPC (VPC2) and a third VPC (VPC3).

VPC2 includes a certificate and key pair management service 224 and a subdomain in DNS management service 220.

VPC3 includes a DNS authoritative server 240.

DNS authoritative server 240 configures and manages DNS records for all domains and their subdomains. Every time a new subdomain is created, a corresponding DNS record (e.g., TXT) may be added to authoritative DNS server 240. (Note that A, AAAA, and PTR records may not be necessary to create the certificate.) Advantageously, if the security services provider operates its own authoritative DNS server, then the security services provider can complete a dns-01 challenge presented by a CA to prove domain ownership during certificate issuance.

Subdomain and DNS management service 220 manages the process of creating a subdomain, adding corresponding DNS records into authoritative DNS server 240, and getting a new domain verified with a certificate for a subdomain. For each subdomain, subdomain management service 220 may use ACME to get a validated domain verified certificate signed by a CA. Subdomain management service 220 may also manage expiry and renewal of certificates.

During this process, subdomain management service 220 may interact with authoritative DNS server 240 to complete the DNS-based (dns-01) domain ownership challenge. It may also interact with certificate and key pair management service 224 for generating a public/private key pair and certificate signing request (CSR). These may be used to sign the ACME negotiations and to securely store the signed certificate. Finally, subdomain management service 220 may also keep track of certificate expiry and handle renewals, as well as handling revocations in case a router subscription expires.

Certificate and key pair management service 224 may be responsible for creating key pairs and CSRs for each subdomain. It may also store key pairs & signed certificates in a secure database.

Home gateway management cloud 230 may be responsible for onboarding new routers, provisioning the subdomain, and providing the key pair and certificate to the router. It may also manage router subscriptions.

It should be noted that the process of creating a new subdomain, configuring its DNS record, and getting a domain validated certificate for that subdomain may take a nontrivial amount of time. For example, the time may be on the order of a few minutes to a few hours. Thus, subdomain management service 220 may optionally maintain a pool of pre-allocated subdomains and corresponding domain validated certificates. These can be used for onboarding new routers, and then be revoked from those routers once provisioning of certificates for those routers is complete. For every new router subscription created on home gateway management cloud 230, home gateway management cloud 230 may request subdomain management service 220 to create a new subdomain and corresponding certificate. Subdomain management service 220 then issues a certificate and the corresponding key pair from the pool of pre-allocated subdomains, and updates the certificate status as provisioned. Home gateway management cloud 230 can then securely provision the certificate and key pair to the router using a secure communication mechanism.

FIGS. 7-11 below provide illustrative hardware platforms that may embody some of the elements described herein. Some of the functions may be provided by software, which may include a secure provisioning algorithm for securely provisioning a certificate to the router. In at least some embodiments, this algorithm may be carried out on more than one device.

By way of illustration of such an algorithm, modern routers often come with a client identity certificate burned into the base firmware by the manufacturer. When a router onboards with home gateway management cloud 230, it may establish a secure sockets layer (SSL) connection with home gateway management cloud 230, wherein it authenticates itself to the management cloud using the identity certificate. Home gateway management cloud 230 may then extract a public key from the client identity certificate received from home gateway 208 and send it to subdomain management service 220. Home gateway management cloud 230 requests from subdomain management service 220 a new domain validated certificate and private key.

Subdomain management service 220 passes the received public key to certificate/key management service 224, and requests a certificate and private key for the subdomain. Certificate and key management service 224 encrypts the private key with the received public key and sends the domain validated certificate, along with an encrypted private key backup, to home gateway management cloud 230 via subdomain management service 220.

Home gateway management cloud 230 may send the encrypted private key and certificate over to home gateway 208, using the secure communication channel established earlier.

The certificate renewal process is similar to that of the certificate issuing, and may also be managed by subdomain management service 220. Subdomain management service 220 may notify home gateway management cloud 230 as soon as the certificate is renewed. Home gateway management cloud 230 then provisions the renewed certificate to home gateway 208 over the secure communication channel, as discussed above.

Finally, the provisioned subdomain and certificate may be used to run a DoT or DoH capable DNS forwarder on the LAN interface of home gateway 208. In this configuration, subdomain management service 220 and certificate/key management service 224 may be provided by the security services provider, and thus do not require any infrastructural changes on the part of the ISP network. However, if the ISP network wishes, it can also host and manage a subdomain management service 220 and/or certificate/key management service 224.

Because certificate issuance is handled on the cloud, this mechanism requires shared keys with home gateway 208 over the wire. In general, sharing private keys over the wire is considered suboptimal security practice. However, in this configuration, the wire is secured by SSL, and the key is additionally encrypted by a public key from home gateway 208. Thus, a high level of security is provided even while sharing keys over the wire.

An alternative approach is to run an ACME client on home gateway 208, and then home gateway management cloud 230 may pass the universal unique identifier (UUID) subdomain to home gateway 208. The ACME client then generates the key pair locally on home gateway 208 and interacts with the certificate authority to get a certificate for the subdomain. During this process, the ACME client may interact with an authoritative DNS server 240 on the cloud to fulfill the domain ownership challenges. This approach avoids sharing private keys over the wire, in embodiments where such avoidance is desired.

FIGS. 3a-3b and FIG. 4 respectively provide signal flow diagrams illustrating algorithms for management of subdomain certificates on the cloud, and provisioning of subdomain certificates to home routers. Aspects of these algorithms are described above in text format, but are illustrated here in signal flow diagram format for additional clarification.

FIGS. 3a and 3b are a signal flow diagram illustrating management of subdomain certificates in the cloud. In FIGS. 3a and 3b, there is illustrated a subdomain management service 304, a certificate key management service 308, an authoritative DNS service 312, and a certificate authority 316.

It is noted initially that subdomain management service 304 maintains a pool of UUIDs that can be provisioned out to routers or home gateways. These UUIDs may be globally unique, or at least globally pseudo-unique.

In operation 1, subdomain management service 304 registers the UUID as a subdomain with authoritative DNS service 312.

In operation 2, authoritative DNS service 312 returns the registered subdomain to subdomain management service 304.

In operation 3, subdomain management service 304 requests a CSR for UUID automation from certificate/key management service 308.

In operation 4, internally to certificate and key management service 308, a new key pair and signed CSR is generated.

In operation 5, certificate and key management service 308 returns the CSR for the UUID subdomain to subdomain management service 304.

In operation 6, subdomain management service 304 initiates an ACME request for the UUID with an order to certificate authority 316.

In operation 7, certificate authority 316 sends a DNS-based domain ownership challenge for the UUID subdomain, which is received by subdomain management service 304 because it owns the UUID-based subdomain.

In operation 8, subdomain management service 304 updates the UUID subdomain record with the ownership challenge to authoritative DNS service 312.

In operation 9, authoritative DNS service 312 returns to subdomain management service 304 a notification that the ownership challenge record has been updated.

In operation 10, subdomain management service 304 fulfills the ownership challenge to certificate authority 316 and requests verification.

In operation 11, certificate authority 316 sends to authoritative DNS service 312 a DNS text record query and validation.

In operation 12, subdomain management service 304 polls the ownership challenge verification status by periodically querying certificate authority 316.

In operation 13, subdomain management service 304 submits a certificate signing request (CSR) with the order to certificate authority 316.

In operation 14, once the verification has been fulfilled, certificate authority 316 sends a verification success message to subdomain management service 304. Subdomain management service 304 then sends the signed CSR with the order to certificate authority 316. Certificate authority 316 then sends a download link for the certificate.

In operation 15, subdomain management service 304 downloads the certificate from certificate authority 316.

In operation 16, subdomain management service 304 instructs authoritative DNS service 312 to remove the ownership challenge for the UUID subdomain from the DNS server.

In operation 17, authoritative DNS service 312 notifies subdomain management service 304 that the challenge has been removed.

In operation 18, subdomain management service 304 validates the certificate.

In operation 19, subdomain management service 304 saves the certificate for UUID subdomain to certificate and key management service 308.

As noted above, FIG. 4 is a signal flow diagram illustrating provisioning of subdomain certificates to home routers or home gateways.

At operation 1, during onboarding, the router or home gateway enrolls itself with gateway management cloud 408 and requests a certificate and private key over a secure TLS connection. This includes operations 2 through 14.

In operation 2, home router 404 sends a registration request to gateway management cloud 408.

In operation 3, gateway management cloud 408 sends a request for a new subdomain from subdomain management service 412.

In operation 4, subdomain management service 412 returns an unassigned subdomain and UUID to gateway management cloud 408.

In operation 5, gateway management cloud 408 provides the UUID and subdomain to home router 404.

In operation 6, home router 404 sends a certificate and private key request to gateway management cloud 408.

In operation 7, gateway management cloud 408 internally extracts the router public key from the client certificate.

In operation 8, gateway management cloud 408 requests a certificate for the UUID, and passes the router public key to subdomain management service 412.

In operation 9, subdomain management service 412 requests to get the certificate for the UUID subdomain from certificate/key management service 416, and passes the router public key to certificate and key management service 416.

In operation 10, internally to certificate and key management service 416, the private key is encrypted with the router's public key for the giving UUID subdomain.

In operation 11, certificate and key management service 416 provides the certificate and encrypted private key to subdomain management service 412.

In operation 12, subdomain management service 412 sends the certificate and encrypted private key to gateway management cloud 408.

In operation 13, the certificate and encrypted private key are provided within the secure TLS session from gateway management cloud 408 to home router 404.

Figure 5A:
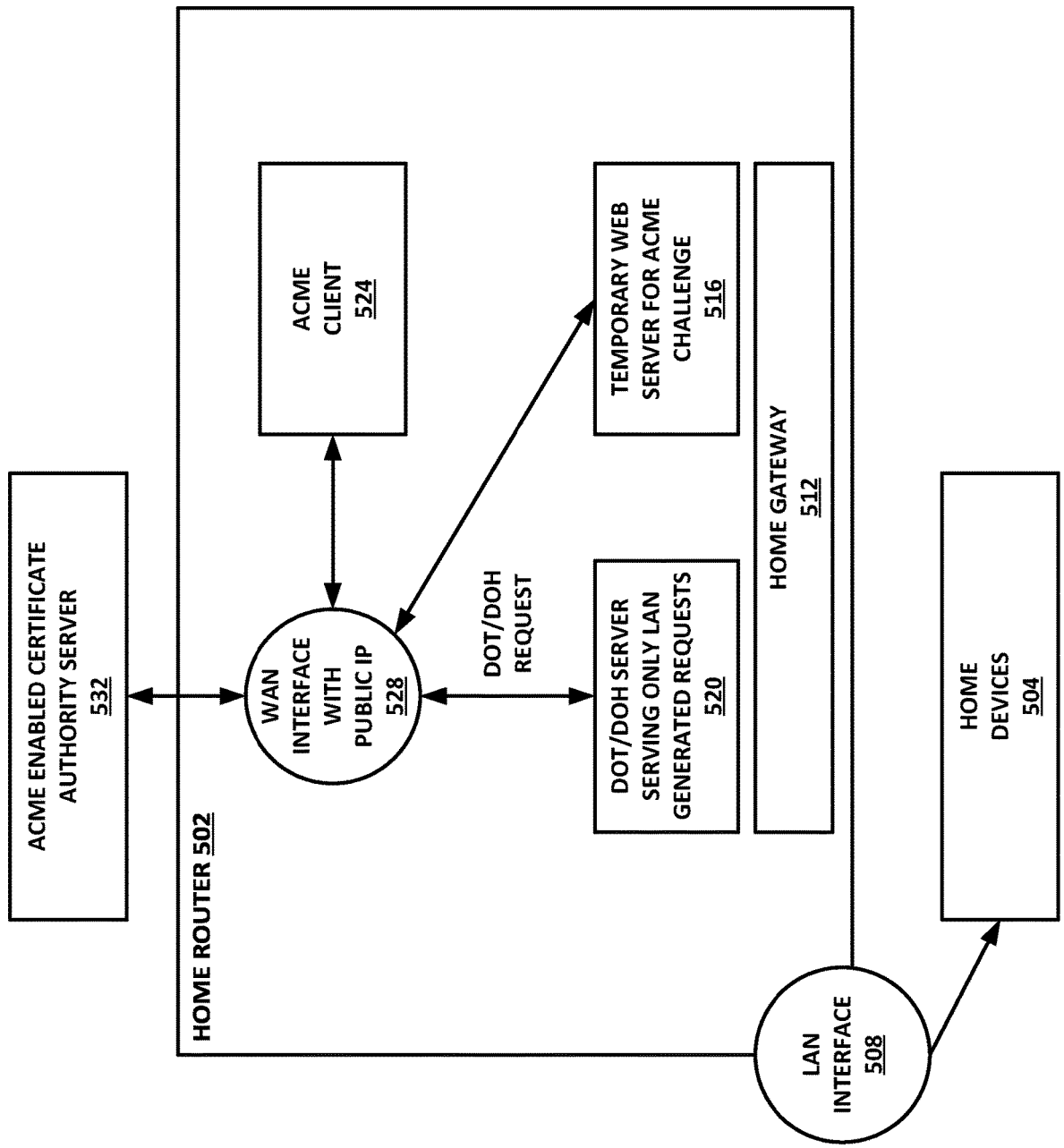
FIGS. 5a and 5b are block diagrams illustrating selected elements of a computing ecosystem.
Figure 6:
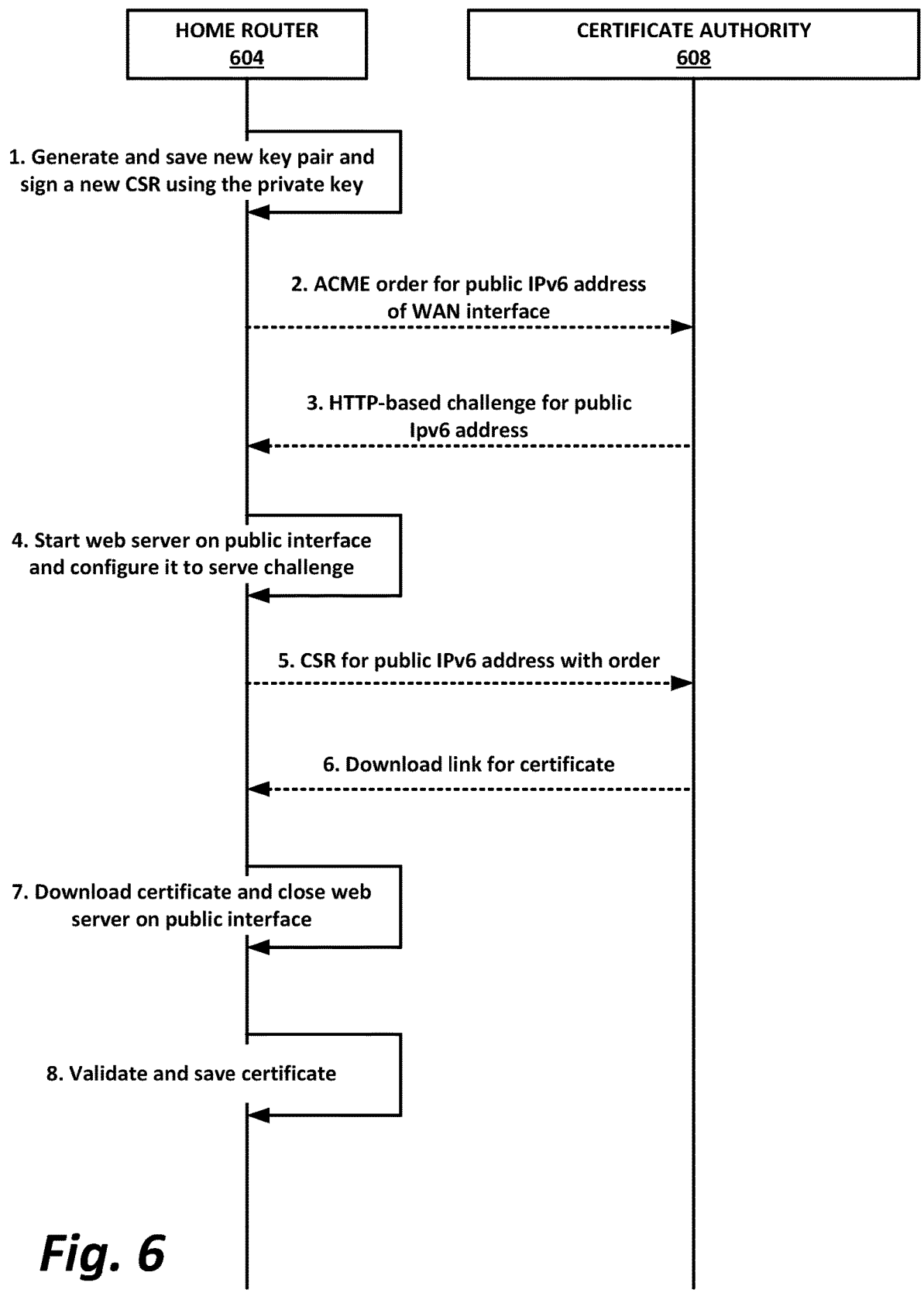
FIG. 6 is a signal flow diagram illustrates an embodiment of a method.

FIG. 5a is a block diagram illustrating selected elements of a computing ecosystem. The computing ecosystem of FIG. 5a may be useful for an embodiment in which a public IP address is assigned to the router to provide IP-validated certificates for a DoT or DoH forwarder.

In this illustration, home devices 504 communicatively couple to a home router 502 via a LAN interface 508. Home router 502 includes a home gateway 512, along with other functions including a DoT/DoH server 520, which serves only LAN-generated requests. In other words, DoT/DoH server 520 may accept incoming packets only on the local network, via LAN interface 508.

Home router 502 also includes a temporary web server 516, which can be used for ACME challenges. This may be provided in the case when IP address certificates are used. In the IP address certificate case, dns01 challenge in not possible and the client has to use http01 challenge requiring a web server to be hosted on the home gateway.

Home router 502 also includes an ACME client 524. DoT/DoH server 520, temporary web server 516, and ACME client 524 all communicatively couple with a wide area network (WAN) interface 528, which provides a public IP. Via WAN interface 528, home router 502 communicates with an ACME enabled certificate authority server 532.

In an embodiment, an ACME IP identifier validation extension may be used to issue a certificate for the public IP address assigned to home router 502 by the ISP. This is somewhat different from the subdomain approach. In this approach, the certificate issuance and renewal management are managed by home router 502 itself. Furthermore, because the IP address is assigned and managed by the ISP, a DNS challenge (dns-01) may not be available as it was in the case of an embodiment using FQDN. Instead, an HTTP challenge (http-01) or a TLS with application level protocol negotiation (TLS ALPN) challenge (tls-alpn-01) may be used to prove IP ownership during the certificate issuance. The issued certificate may have a public IPv6 address in, for example, an IP address name field of a subject alternative name (SAN) extension.

Figure 5B:
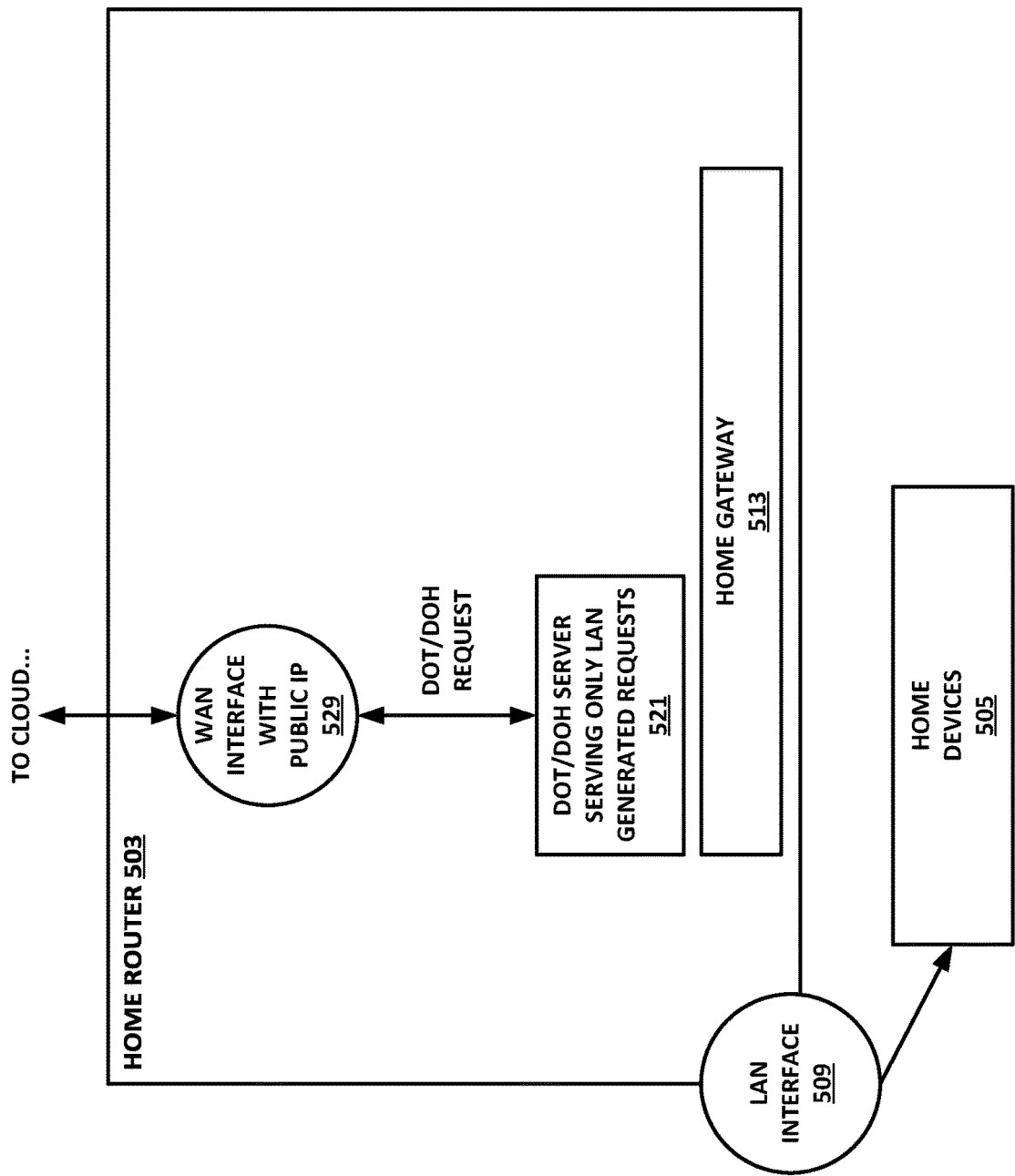

FIG. 5b is a block diagram illustrating further selected elements of a computing ecosystem. The computing ecosystem of FIG. 5b may be useful for an embodiment in which an FQDN is used to service DoH/DoT requests.

In this illustration, home devices 505 communicatively couple to a home router 503 via a LAN interface 509. Home router 503 includes a home gateway 513, along with other functions including a DoT/DoH server 521, which serves only LAN-generated requests. In other words, DoT/DoH server 521 may accept incoming packets only on the local network, via LAN interface 509.

Home router 503 does not require a temporary web server or ACME client, as in FIG. 5a, because certificates are handled in the cloud.

DoT/DoH server 521 communicatively couples with a WAN interface 529, which provides a public IP. DoT/DoH Server 521 receives a certificate and other information via WAN interface 529, from a cloud service as described above.

As in the previous example, a hardware platform such as those disclosed in FIGS. 7-11 may be provided, and may run appropriate software. The software may provide an algorithm as follows.

Home router 502 may generate a key pair and CSR locally on the router. It may then use an ACME agent or ACME client 524 to communicate with CA 532 to get a certificate for the IPv6 address generated from the IPv6 prefix assigned on its WAN interface. ACME client 524 may suggest that it can do http-01 challenges.

CA 532 may respond with the http-01 challenge that the router needs to complete to prove ownership of the IP address. To complete the challenge, ACME client 524 may start an HTTP web service 516 (e.g., serving only at port 80) and configure it to serve the challenge. ACME client 524 may then notify CA 532 that the challenge is ready for verification. CA 532 may then verify the challenge and issue the certificate.

The HTTP web service 516 is terminated once the challenge verification is complete and the certificate has been issued. ACME client 524 may then download the certificate and stop web service 516. ACME client 524 may also monitor the certificate for renewal, and relaunch web service 516 to complete the challenge during renewals.

Whether in this embodiment, or in the previous embodiment that used the FQDN, a DoT or DoH server may provide an algorithm that includes enhanced security services or domain name-based screening, parental control, enterprise controls, or other services. Specifically, because DoT/DoH server 520 now appears as a publicly available DoT or DoH server to endpoints on the home network, it can service DNS requests. It receives the encrypted DNS requests, inspects them, checks them against, for example, ACLs or other rules to determine how to handle them, and then acts appropriately. Depending on the rules, a DNS request may be blocked, serviced, or forwarded, by way of nonlimiting example. In the case of blocking, the connection may simply be dropped, and the user may not get through to the requested website. Alternatively, the server could return a dummy web page that notifies the user that the requested domain name has been blocked, according to policy. In the case of servicing, such as for a local domain name, the DNS server may look up the request in its local database and resolve the request to a local IP address. Similarly, if the request is for a cached query, then the request may be resolved to a public IP address. Finally, if it is a request that is not for a blocked domain name, and it is directed to a domain name that cannot be serviced locally, the request may be forwarded to an authoritative DNS server to handle the request.

FIG. 6 is a signal flow diagram that illustrates an embodiment of the preceding method. In this method, the complete certificate issuance process happens during the router onboarding. As discussed above, the entire ACME-based automatic certificate issuance process may take some time, and one issue here is to complete onboarding as quickly as possible to start securing endpoint devices. One way of optimizing the time spent during the ACME procedure is to have an explicit tie-up with the CA to speed up challenge verification and certificate issue processes.

In FIG. 6, there is a home router 604 communicating with a certificate authority supporting ACME 608.

As illustrated in FIG. 6, during its onboarding, home router 604 requests an IPv6 certificate from CA 608 using an ACME agent.

In operation 1, home router 604 generates and saves a new key pair and signs a new CSR using the private key.

In operation 2, home router 604 sends an ACME order for the public IPv6 address on its WAN interface to certificate authority 608.

In operation 3, certificate authority 608 sends an HTTP-based challenge for the public IPv6 address.

In operation 4, home router 604 starts a web service on the public interface and configures it to service the challenge.

In operation 5, home router 604 sends a CSR for the public IPv6 address with the order to certificate authority 608.

In operation 6, certificate authority 608, after verifying the successful challenge, sends a download link for the certificate to home router 604.

In operation 7, home router 604 downloads the certificate and closes the web server on the public interface.

In operation 8, home router 604 validates and saves the certificate.

Once the process is complete, the router can start its services, including DoT or DoH on a public IP address using the certificate. In some cases, home router 604 may ensure that its DNS interface is only accessible to local devices.

Once a domain name and server certificate are provisioned into the home router using any of the methods discussed herein, the DoT/DoH forwarder may act like a public DoT/DoH server, but in some embodiments, is accessible only to the endpoints in the home network. This enables home routers to provide DNS filtering, DNS-based parental controls, and MUD-based IoT firewall protection over DoT, DoH, and other security and privacy services. Furthermore, the public domain name (or IP address using IP6.ARPA reverse mapping of IP address as a domain name value) and DNS server certificate of the local DoT/DoH capable DNS server can be securely bootstrapped to the endpoints using mechanisms discussed in proposed standards.

It should be noted that the solution discussed herein is not limited to home networks, but can be deployed in any kind of network, including in server message block (SMB) networks. Furthermore, in the case of enterprise networks, branch offices can use local DoT or DoH forwarders to enforce branch-specific policies, without having to forward the traffic to a head office for policy enforcement.

Figure 7:
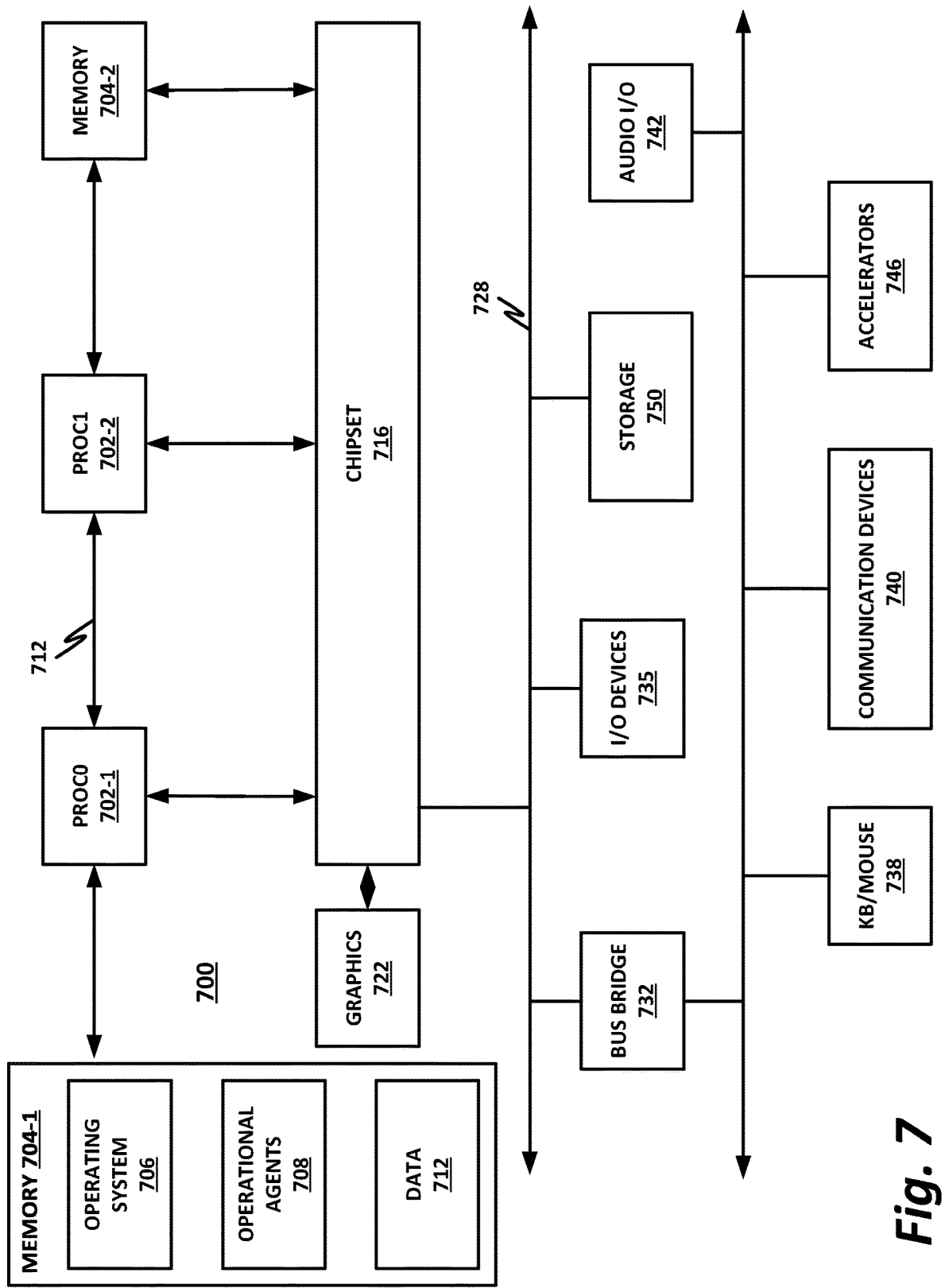
FIG. 7 is a block diagram of selected elements of a hardware platform.

FIG. 7 is a block diagram of a hardware platform 700. In at least some embodiments, hardware platform 700 may be configured or adapted to provide home or enterprise router-based secure domain name services, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via a network interface, or retrieved from another source via any suitable interconnect. Once received (from any source), the instructions may be loaded into memory 704, and may then be executed by one or more processor 702 to provide elements such as an operating system 706, operational agents 708, or data 712.

Figure 9:
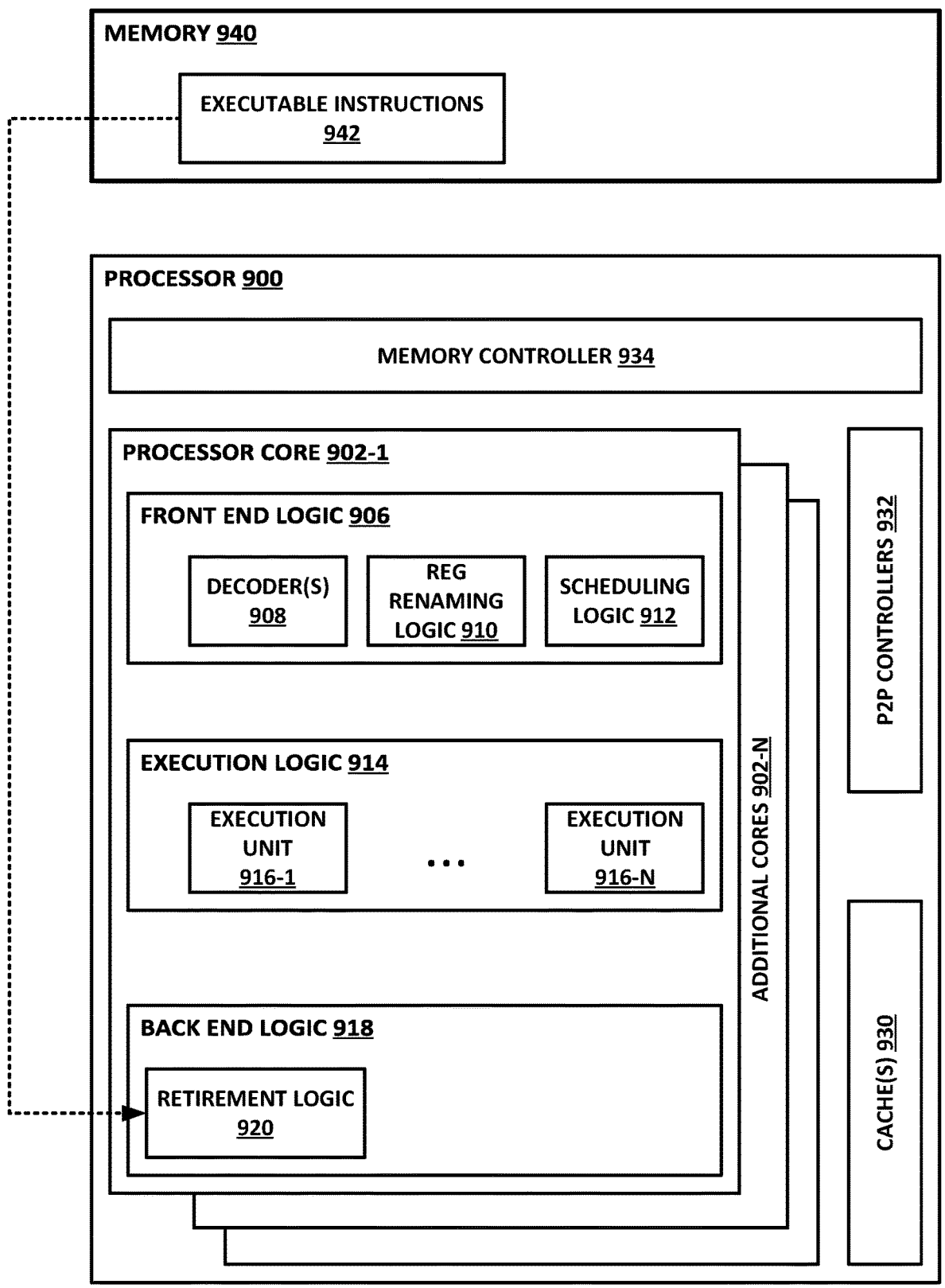
FIG. 9 is a block diagram of selected elements of a processor.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Details of processors 702 are not illustrated in this FIGURE, but one embodiment is illustrated in FIG. 9. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high performance graphics adapter 722. In alternative embodiments, any or all of the PtP links illustrated in FIG. 7 could be implemented as any type of bus, or other configuration rather than a PtP link. In various embodiments, chipset 716 may reside on the same die or package as a processor 702 or on one or more different dies or packages. Each chipset may support any suitable number of processors 702. A chipset 716 (which may be a chipset, uncore, Northbridge, Southbridge, or other suitable logic and circuitry) may also include one or more controllers to couple other components to one or more central processor units (CPU).

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with a processor 702 via a bus. For example, some memories may be connected via a system bus, or in a data center, memory may be accessible in a remote DMA (RDMA) configuration.

Memory 704 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of processors 702 or other processing elements (e.g., logic resident on chipsets 716) to provide functionality.

In certain embodiments, memory 704 may comprise a relatively low-latency volatile main memory, while storage 750 may comprise a relatively higher-latency non-volatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human-readable visual output, such as a command-line interface (CLI) or graphical desktop such as Microsoft Windows, Apple OSX desktop, or a Unix/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 722 may include a hardware graphics card, which may have its own memory and its own graphics processing unit (GPU).

Chipset 716 may be in communication with a bus 728 via an interface circuit. Bus 728 may have one or more devices that communicate over it, such as a bus bridge 732, I/O devices 735, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by a network interface and the various I/O devices described herein. This may include, for example, various universal serial bus (USB), FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O 742, and/or accelerators 746. In alternative embodiments, any portions of the bus architectures could be implemented with one or more PtP links.

Operating system 706 may be, for example, Microsoft Windows, Linux, UNIX, Mac OS X, iOS, MS-DOS, or an embedded or real-time operating system (including embedded or real-time flavors of the foregoing). In some embodiments, a hardware platform 700 may function as a host platform for one or more guest systems that invoke application (e.g., operational agents 708).

Operational agents 708 may include one or more computing engines that may include one or more non-transitory computer-readable mediums having stored thereon executable instructions operable to instruct a processor to provide operational functions. At an appropriate time, such as upon booting hardware platform 700 or upon a command from operating system 706 or a user or security administrator, a processor 702 may retrieve a copy of the operational agent (or software portions thereof) from storage 750 and load it into memory 704. Processor 702 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a LAN, metropolitan area network (MAN), WAN, wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 700 may be virtualized, in particular the processor(s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 8. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 8:
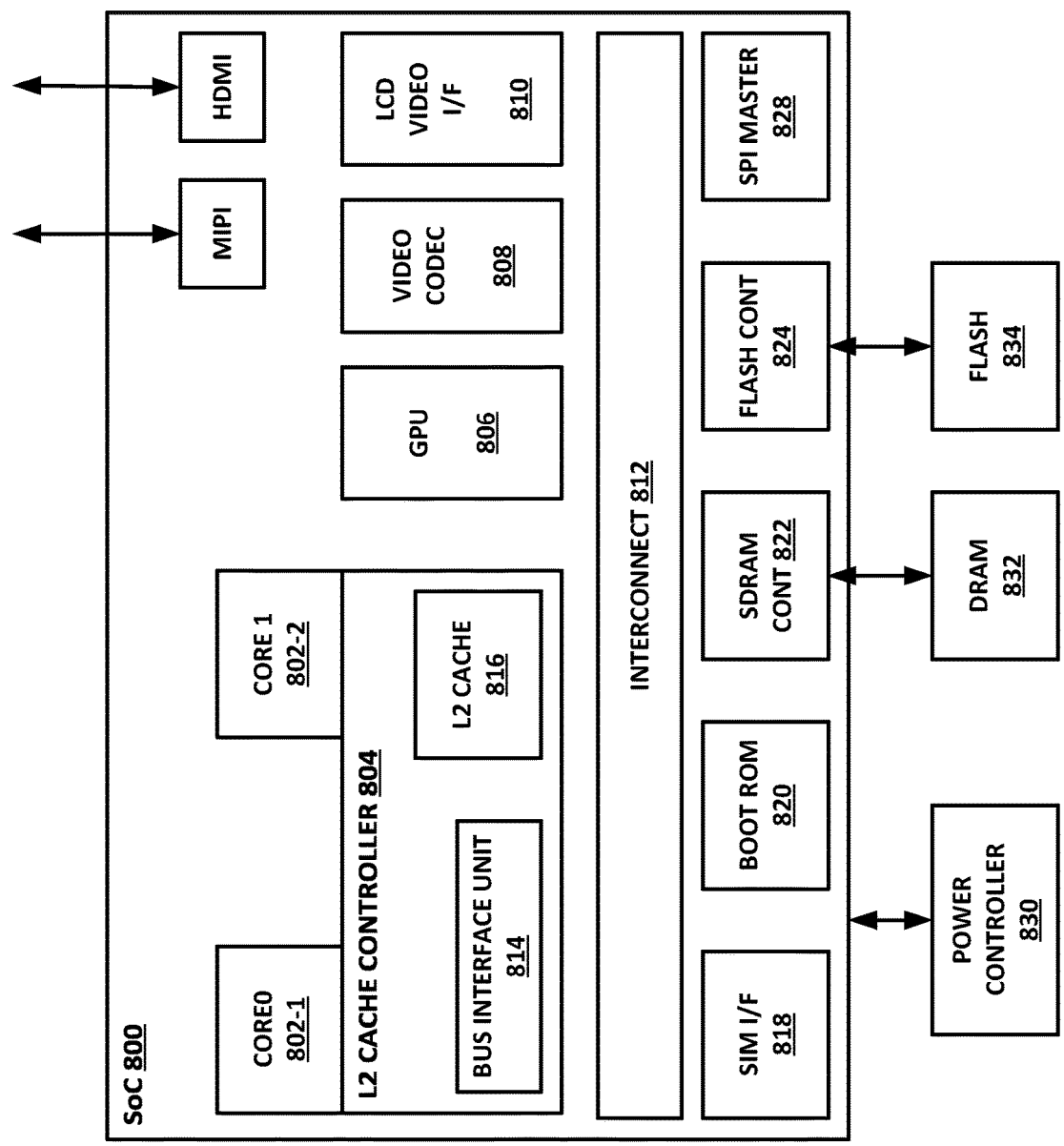
FIG. 8 is a block diagram of selected elements of a system-on-a-chip (SoC).

FIG. 8 is a block illustrating selected elements of an example SoC 800. In at least some embodiments, SoC 800 may be configured or adapted to provide home or enterprise router-based secure domain name services, according to the teachings of the present specification.

At least some of the teachings of the present specification may be embodied on an SoC 800, or may be paired with an SoC 800. SoC 800 may include, or may be paired with, an advanced reduced instruction set computer machine (ARM) component. For example, SoC 800 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 800 could also be integrated into, for example, a PC, server, video processing components, laptop computer, notebook computer, netbook, or touch-enabled device.

As with hardware platform 700 above, SoC 800 may include multiple cores 802-1 and 802-2. In this illustrative example, SoC 800 also includes an L2 cache control 804, a GPU 806, a video codec 808, a liquid crystal display (LCD) I/F 810 and an interconnect 812. L2 cache control 804 can include a bus interface unit 814, a L2 cache 816. Liquid crystal display (LCD) I/F 810 may be associated with mobile industry processor interface (MIPI)/HDMI links that couple to an LCD.

SoC 800 may also include a subscriber identity module (SIM) I/F 818, a boot ROM 820, a synchronous dynamic random access memory (SDRAM) controller 822, a flash controller 824, a serial peripheral interface (SPI) master 828, a suitable power control 830, a dynamic RAM (DRAM) 832, and flash 834. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 800 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 9 is a block diagram illustrating selected elements of a processor 900. In at least some embodiments, processor 900 may be configured or adapted to provide home or enterprise router-based secure domain name services, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 900 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and non-volatile or slower memory that is used for storage. However, this split in memory is not necessary, and in some hardware platforms, a single memory structure is used. The hardware platform genus includes a wide range of devices, spanning from single-purpose embedded computers running on an ASIC, or running on a special-purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via network function virtualization (NFV), and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple virtual machines (VMs) are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 900 includes one or more processor cores 902, including core 902-1-902-N. Cores 902 may be, as appropriate, single-thread cores or multi-thread cores. In multi-threaded cores, more than one hardware thread may be provided at a time, and the core may therefore provide more than one logical core per physical core. The cores may be configured to execute instruction code. Each processor 900 may include at least one shared cache 930, which may be treated logically as part of memory 940. Memory 940 may include executable instructions 942, as illustrated. Caches 930 may be filled according to known caching techniques, and may store instructions and/or data that may be used by one or more components of processor 900.

Processor 900 may include an integrated memory controller (MC) 934, to communicate with memory 940. Memory controller 934 may include logic and circuitry to interface with memory 940, and may also include a cache controller to handle filling and evicting instructions and data to and from cache 930.

By way of example, each core 902 may include front-end logic 906, execution logic 914, and backend logic 918.

In the illustrated embodiment, front-end logic 906 includes an instruction decoder or decoders 908, register renaming logic 910, and scheduling logic 912. Decoder 908 may decode instructions received. Register renaming logic 910 may provide register renaming, for example to facilitate pipelining. Scheduling logic 912 may schedule instruction execution, and may provide out-of-order (OOO) execution. Front-end logic 906 may fetch incoming instructions, perform various processing (e.g., caching, decoding, branch predicting, etc.), and pass instructions to execution logic 914.

Execution logic 914 includes one or more execution units 916-1-916-N. Execution units 916 may include hardware instructions and microcode to carry out the provided instructions.

Backend logic 918 includes retirement logic 920. Core 902 may provide for speculative execution of instructions, branch prediction, and similar. Retirement logic 920 may be configured to determine which predicted instructions were actually needed by the program flow.

Processor 900 may also include a PtP controller 932, which enables connection to an uncore, chipset, Northbridge, Southbridge, or bus, by way of example.

Figure 10:
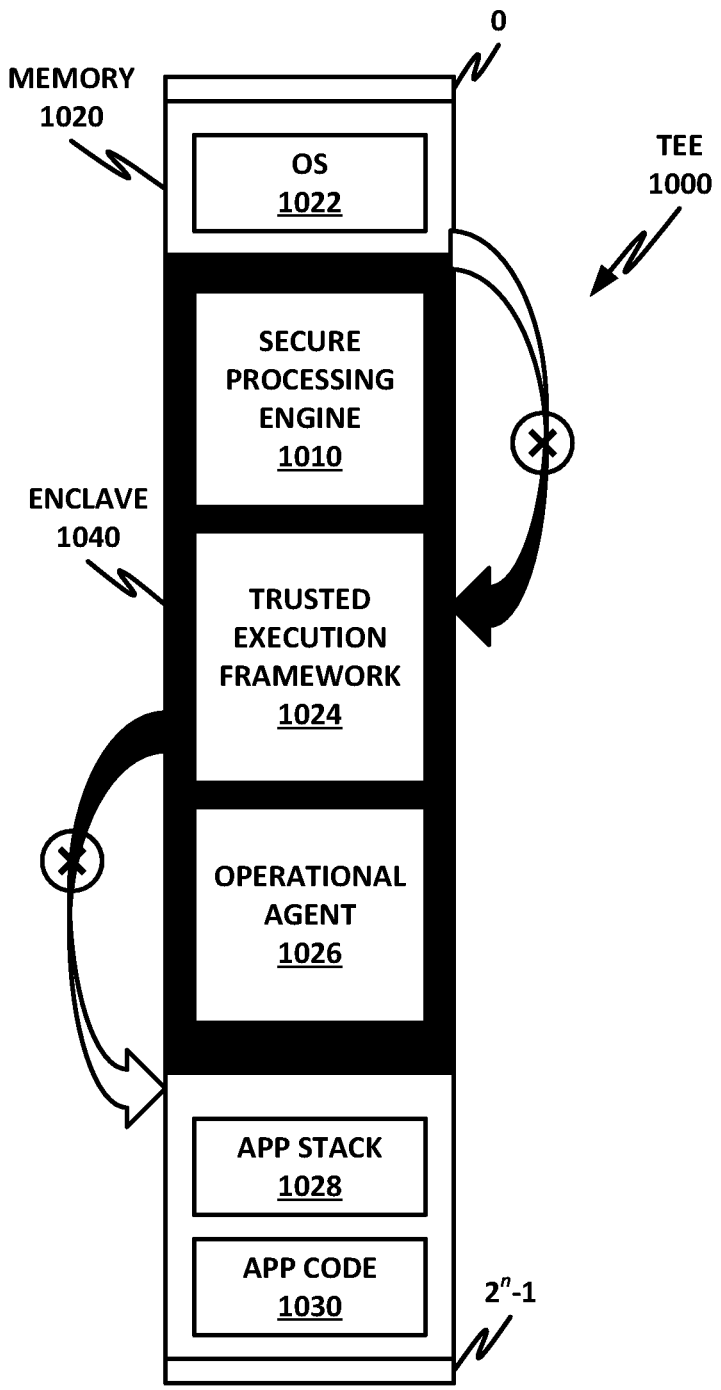
FIG. 10 is a block diagram of selected elements of a trusted execution environment (TEE).

FIG. 10 is a block diagram of a trusted execution environment (TEE) 1000. In at least some embodiments, home or enterprise router-based secure domain name services according to the teachings of the present specification may be provided within TEE 1000.

In the example of FIG. 10, memory 1020 is addressable by n-bits, ranging in address from 0 to $2^n-1$ (note, however, that in many cases, the size of the address space may far exceed the actual memory available). Within memory 1020 is an OS 1022, enclave 1040, application stack 1020, and application code 1030.

In this example, enclave 1040 is a specially-designated portion of memory 1020 that cannot be entered into or exited from except via special instructions, such as Intel Software Guard Extensions (SGX) or similar. Enclave 1040 is provided as an example of a secure environment which, in conjunction with a secure processing engine 1010, forms a TEE 1000 on a hardware platform such as platform 700 of FIG. 7. A TEE 1000 is a combination of hardware, software, and/or memory allocation that provides the ability to securely execute instructions without interference from outside processes, in a verifiable way. By way of example, TEE 1000 may include memory enclave 1040 or some other protected memory area, and a secure processing engine 1010, which includes hardware, software, and instructions for accessing and operating on enclave 1040. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1010 may be a user-mode application that operates via trusted execution framework 1024 within enclave 1040. TEE 1000 may also conceptually include processor instructions that secure processing engine 1010 and trusted execution framework 1024 require to operate within enclave 1040.

Secure processing engine 1010 and trusted execution framework 1024 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1022 may be excluded from TCB, in addition to the regular application stack 1028 and application code 1030.

In certain systems, computing devices equipped with Intel SGX or equivalent instructions may be capable of providing an enclave 1040. It should be noted, however, that many other examples of TEEs are available, and TEE 1000 is provided only as one example thereof. Other secure environments may include, by way of nonlimiting example, a virtual machine, sandbox, testbed, test machine, or other similar device or method for providing a TEE 1000.

In an example, enclave 1040 provides a protected memory area that cannot be accessed or manipulated by ordinary computer instructions. Enclave 1040 is described with particular reference to an Intel SGX enclave by way of example, but it is intended that enclave 1040 encompass any secure processing area with suitable properties, regardless of whether it is called an "enclave."

One feature of an enclave is that once an enclave region 1040 of memory 1020 is defined, as illustrated, a program pointer cannot enter or exit enclave 1040 without the use of special enclave instructions or directives, such as those provided by Intel SGX architecture. For example, SGX™ processors provide the ENCLU[EENTER], ENCLU[ERESUME], and ENCLU[EEXIT]. These are the only instructions that may legitimately enter into or exit from enclave 1040.

Thus, once enclave 1040 is defined in memory 704, a program executing within enclave 1040 may be safely verified to not operate outside of its bounds. This security feature means that secure processing engine 1010 is verifiably local to enclave 1040. Thus, when an untrusted packet provides its content to be rendered with trusted execution framework 1024 of enclave 1040, the result of the rendering is verified as secure.

Enclave 1040 may also digitally sign its output, which provides a verifiable means of ensuring that content has not been tampered with or modified since being rendered by secure processing engine 1010. A digital signature provided by enclave 1040 is unique to enclave 1040 and is unique to the hardware of the device hosting enclave 1040.

Figure 11:
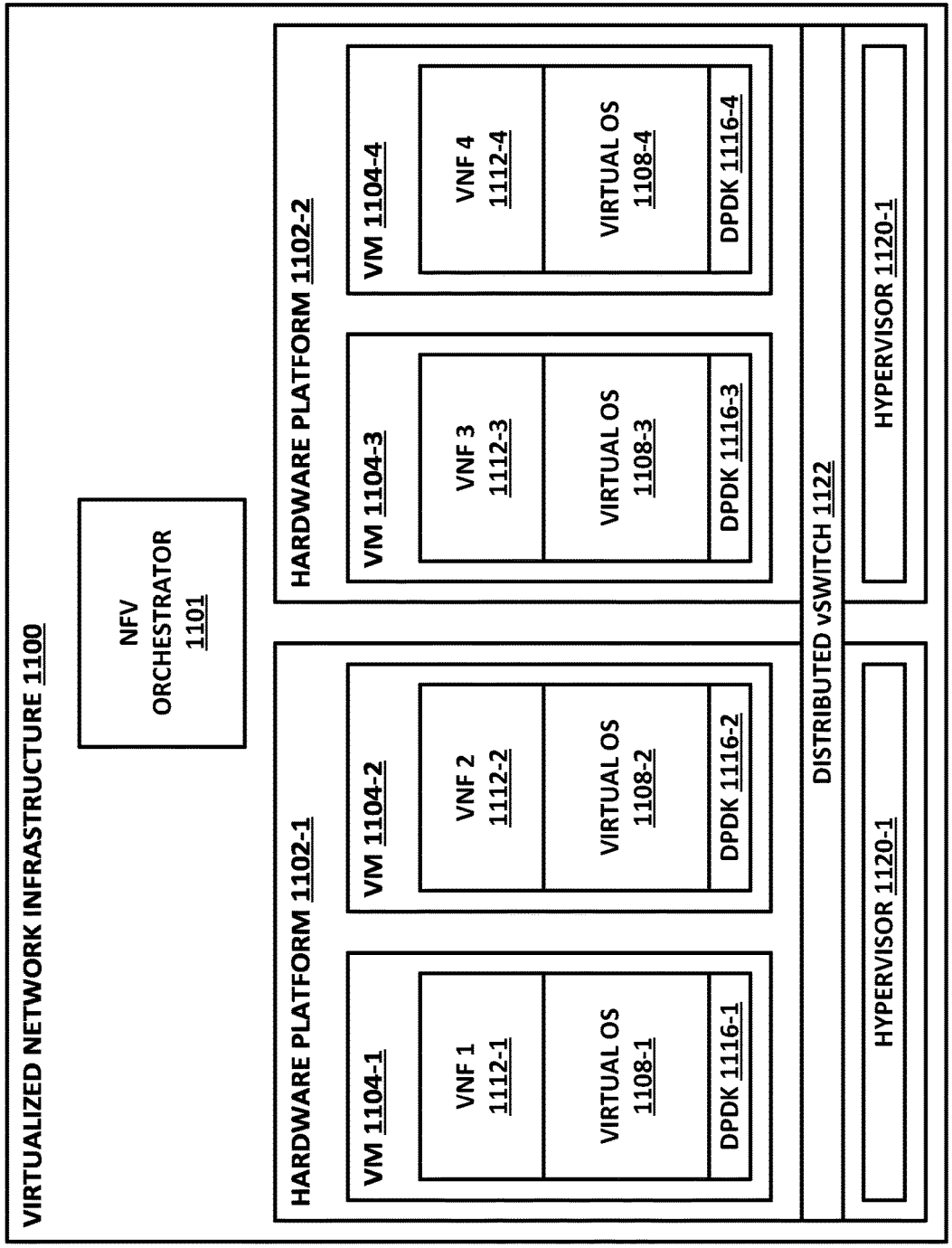
FIG. 11 is a block diagram of selected elements of a network function virtualization (NFV) infrastructure.

FIG. 11 is a block diagram of a network function virtualization (NFV) infrastructure 1100. In at least some embodiments, home or enterprise router-based secure domain name services according to the teachings of the present specification may be provided within NFV infrastructure 1100.

NFV is an aspect of network virtualization that is generally considered distinct from, but that can still interoperate with, software-defined networking (SDN). For example, VNFs may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

VNFs could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile random access memory (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed in one example, a home router, comprising: a hardware platform comprising a processor and a memory; a local area network (LAN) interface; a data store comprising rules for domain name-based services; and instructions encoded within the memory to instruct the processor to: provision a certificate and key pair to provide domain name system (DNS) over hypertext transfer protocol secure (DoH) or DNS over transport layer security (DoT) services; receive on the LAN interface an encrypted DNS request; decrypt the DNS request; query the data store according to the DNS request; receive a rule for the DNS request; and execute the rule.

There is further disclosed an example home router, wherein executing the rule comprises dropping the request.

There is further disclosed an example home router, wherein executing the rule comprises serving a web page that indicates a domain name for the request is blocked.

There is further disclosed an example home router, wherein executing the rule comprises locating a domain name in a DNS cache.

There is further disclosed an example home router, wherein executing the rule comprises forwarding the DNS request.

There is further disclosed an example home router, wherein executing the rule comprises looking up a local domain name.

There is further disclosed an example home router, wherein provisioning the certificate and key pair comprises receiving the certificate and key pair from a home router management service.

There is further disclosed an example home router, wherein the home router is further to receive a fully qualified domain name (FQDN) from the home router management service.

There is further disclosed an example home router, wherein the FQDN is derived at least in part from an internet protocol address of the home router.

There is further disclosed an example home router, wherein the IP address is an internet protocol version 6 (IPv6) address.

There is further disclosed an example home router, wherein the FQDN includes a user-selected subdomain.

There is further disclosed an example home router, wherein the home router includes logic to generate a key pair and certificate signing request (CSR).

There is further disclosed an example home router, wherein the home router further includes an automatic certificate management environment (ACME) client to receive a certificate from a certificate authority (CA).

There is further disclosed an example home router, wherein the certificate is an IP address-based certificate.

There is further disclosed an example home router, wherein the IP address is an IPv6 address.

There is also disclosed an example computer network, comprising: a home gateway comprising an access control rules data store, a caching domain name system (DNS) over hypertext transfer protocol secure (DoH) or DNS over transport layer security (DoT) capable domain name server, and logic to provide domain name-based access control according to the access control rules database; and a home gateway management server comprising logic to assign the home gateway a fully qualified domain name (FQDN), including a subdomain including a unique identifier for the home gateway, receive from a certificate authority (CA) a valid certificate for the FQDN, and provision the valid certificate to the home gateway.

There is further disclosed an example computer network, further comprising a subdomain management server configured to provide the subdomain to the home gateway management server.

There is further disclosed an example computer network, wherein the subdomain management server is further configured to add a DNS record for the FQDN into an authoritative DNS server.

There is further disclosed an example computer network, further comprising a key management server configured to create a key pair for the home gateway.

There is further disclosed an example computer network, wherein the key management server is further configured to create a certificate signing request (CSR) for the home gateway.

There is further disclosed an example computer network, wherein provisioning the valid certificate to the home gateway comprises receiving the certificate from a home router management service.

There is further disclosed an example computer network, wherein the computer network is further to receive a fully qualified domain name (FQDN) from the home router management service.

There is further disclosed an example computer network, wherein the FQDN is derived at least in part from an internet protocol address of the computer network.

There is further disclosed an example computer network, wherein the IP address is an internet protocol version 6 (IPv6) address.

There is further disclosed an example computer network, wherein the FQDN includes a user-selected subdomain.

There is also disclosed an example method of providing rich domain name system (DNS) over hypertext transfer protocol secure (DoH) or DNS over transport layer security (DoT) services on a home or enterprise network, comprising: provisioning a home router with a certificate and key pair; receiving on the home router an encrypted DNS request; decrypting the DNS request; determining whether to handle the DNS request locally; if handling locally, perform a local action on the DNS request; and if not handling locally, forward the DNS request to an authoritative DNS server.

There is further disclosed an example method, wherein provisioning the home router with the certificate and key pair comprises receiving the certificate and key pair from a home router management service.

There is further disclosed an example method, wherein the home router is further to receive a fully qualified domain name (FQDN) from the home router management service.

There is further disclosed an example method, wherein the FQDN is derived at least in part from an internet protocol address of the home router.

There is further disclosed an example method, wherein the IP address is an internet protocol version 6 (IPv6) address.

There is further disclosed an example method, wherein the FQDN includes a user-selected subdomain.

There is further disclosed an example method, wherein the home router includes logic to generate a key pair and certificate signing request (CSR).

There is further disclosed an example method, wherein the home router further includes an automatic certificate management environment (ACME) client to receive a certificate from a certificate authority (CA).

There is further disclosed an example method, wherein the certificate is an IP address-based certificate.

There is further disclosed an example method, wherein the IP address is an IPv6 address.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

What is claimed is:

1. A home router, comprising:
a hardware platform comprising a processor circuit and a memory;
a local area network (LAN) interface; and
instructions encoded within the memory to instruct the processor circuit to:
receive from an external router management service a fully-qualified domain name (FQDN) for the home router, a domain validation certificate signed by a public certificate authority (CA), and key pair to provide domain name system (DNS) over hypertext transfer protocol secure (DoH) or DNS over transport layer security (DoT) services;
receive on the LAN interface an encrypted DNS request from an endpoint;
decrypt the encrypted DNS request using the key pair;
lookup a rule associated with a domain name of the encrypted DNS request; and
execute the rule.

2. The home router of claim 1, wherein executing the rule comprises dropping the encrypted DNS request.

3. The home router of claim 1, wherein executing the rule comprises serving a webpage that indicates a domain name for the encrypted DNS request is blocked.

4. The home router of claim 1, wherein executing the rule comprises locating a domain name in a DNS cache.

5. The home router of claim 1, wherein executing the rule comprises forwarding the encrypted DNS request.

6. The home router of claim 1, wherein executing the rule comprises looking up a local domain name.

7. The home router of claim 1, wherein the FQDN is derived at least in part from an internet protocol (IP) address of the home router.

8. The home router of claim 7, wherein the IP address is an internet protocol version 6 (IPv6) address.

9. The home router of claim 1, wherein the FQDN includes a user-selected subdomain.

10. The home router of claim 1, wherein the home router includes logic to generate a key pair and certificate signing request (CSR).

11. The home router of claim 1, wherein the home router further includes an automatic certificate management environment (ACME) client to receive a certificate from the public CA.

12. The home router of claim 11, wherein the certificate is an IP address-based certificate.

13. A computer-implemented, comprising:
receiving from an external router management service a fully-qualified domain name (FQDN) for a home router, a domain validation certificate signed by a public certificate authority (CA), and a key pair to provide domain name system (DNS) over hypertext transfer protocol secure (DoH) or DNS over transport layer security (DoT) services;
receiving an encrypted DNS request from an endpoint;
decrypting the encrypted DNS request using the key pair;
looking up a rule associated with a domain name of the encrypted DNS request; and
executing the rule.

14. The computer-implemented method of claim 13, wherein executing the rule comprises locating a domain name in a DNS cache.

15. The computer-implemented method of claim 13, wherein executing the rule comprises forwarding the encrypted DNS request.

16. The computer-implemented method of claim 13, further comprising providing an automatic certificate management environment (ACME) client to receive a certificate from the public CA.

17. One or more tangible, nontransitory computer-readable media having stored thereon executable instructions to instruct a processor circuit to:
receive from an external router management service a fully-qualified domain name (FQDN) for a home router, a domain validation certificate signed by a public certificate authority (CA), and a key pair to provide domain name system (DNS) over hypertext transfer protocol secure (DoH) or DNS over transport layer security (DoT) services;

receive an encrypted DNS request from an endpoint;
decrypt the encrypted DNS request using the key pair;
lookup a rule associated with a domain name of the encrypted DNS request; and
execute the rule.

18. The one or more tangible, nontransitory computer-readable media of claim 17, wherein executing the rule comprises locating a domain name in a DNS cache.

19. The one or more tangible, nontransitory computer-readable media of claim 17, wherein executing the rule comprises forwarding the encrypted DNS request.

* * * * *

UNITED STATES PATENT AND TRADEMARK OFFICE
CERTIFICATE OF CORRECTION

| | | |
|---|---|---|
| PATENT NO. | : 11,632,254 B2 | Page 1 of 1 |
| APPLICATION NO. | : 16/899894 | |
| DATED | : April 18, 2023 | |
| INVENTOR(S) | : Konda et al. | |

It is certified that error appears in the above-identified patent and that said Letters Patent is hereby corrected as shown below:

On the Title Page

In Item (71), under "Applicant", in Column 1, Line 1, delete "McAfee, LLC.," and insert -- McAfee, LLC, --, therefor.

Signed and Sealed this
Fourth Day of July, 2023

Katherine Kelly Vidal
*Director of the United States Patent and Trademark Office*